United States Patent
Furuya et al.

(10) Patent No.: US 8,961,366 B2
(45) Date of Patent: Feb. 24, 2015

(54) HYBRID SYSTEM OF ENGINE AND MOTOR GENERATOR

(71) Applicant: Fuji Jukogyo Kabushiki Kaisha, Tokyo (JP)

(72) Inventors: Akira Furuya, Tokyo (JP); Keiichi Kakizaki, Tokyo (JP); Kentaro Hirota, Tokyo (JP); Shigeki Tajima, Tokyo (JP); Yosuke Kubota, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/209,854

(22) Filed: Mar. 13, 2014

(65) Prior Publication Data

US 2014/0287870 A1 Sep. 25, 2014

(30) Foreign Application Priority Data

Mar. 21, 2013 (JP) ................. 2013-058180

(51) Int. Cl.
*H02P 15/00* (2006.01)
*B60W 20/00* (2006.01)

(52) U.S. Cl.
CPC ............. *B60W 20/10* (2013.01); *Y10S 903/902* (2013.01); *Y10S 903/951* (2013.01)
USPC ................. 477/8; 903/951; 477/180; 903/902

(58) Field of Classification Search
USPC ............. 477/3, 5–8, 166, 167, 174, 180, 181
See application file for complete search history.

(56) References Cited

U.S. PATENT DOCUMENTS

| | | | | |
|---|---|---|---|---|
| 6,048,288 | A | * | 4/2000 | Tsujii et al. .................... 477/5 |
| 7,695,400 | B2 | * | 4/2010 | McGee ........................... 477/5 |
| 8,166,945 | B2 | * | 5/2012 | Spicer et al. ............. 123/179.28 |
| 2009/0033258 | A1 | * | 2/2009 | Atarashi .................... 318/400.3 |
| 2009/0098976 | A1 | * | 4/2009 | Usoro et al. .................... 477/5 |
| 2009/0298646 | A1 | * | 12/2009 | Parsons ........................ 477/167 |
| 2012/0206002 | A1 | * | 8/2012 | Holcomb ...................... 310/113 |
| 2012/0225751 | A1 | * | 9/2012 | Andreae et al. ................. 477/5 |

FOREIGN PATENT DOCUMENTS

| | | |
|---|---|---|
| JP | 58-9820 U | 1/1983 |
| JP | 05-305822 A | 11/1993 |

* cited by examiner

*Primary Examiner* — Justin Holmes
(74) *Attorney, Agent, or Firm* — McGinn IP Law Group, PLLC

(57) ABSTRACT

An engine is provided with an output shaft and a motor generator connection shaft of a crankshaft at ends of a crank case and adapted such that the output shaft can be connected with an external driven apparatus. A motor generator has stators relatively fixed to the crank case and a rotor coupled with the motor generator connection shaft and rotating relative to the stators. An external apparatus connection shaft is connected with the rotor and disposed at an end of the motor generator on the opposite side of the engine. A clutch is disposed between the motor generator connection shaft and the rotor. A power storage unit stores electric power generated by the motor generator and supplies the electric power to the motor generator. A controller switches between an electric power generation function and a motor function, and engages and disengages the clutch.

15 Claims, 1 Drawing Sheet

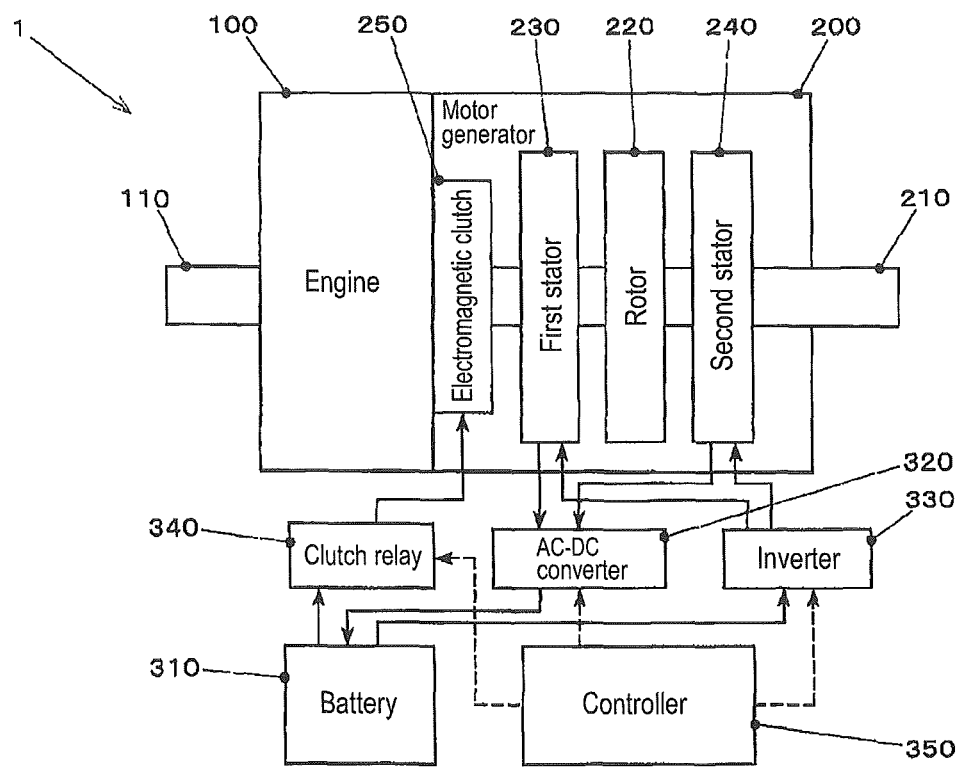

US 8,961,366 B2

HYBRID SYSTEM OF ENGINE AND MOTOR GENERATOR

CROSS-REFERENCE TO RELATED APPLICATIONS

The present application claims priority from Japanese Patent Application No. 2013-058180 filed on Mar. 21, 2013, the entire contents of which are hereby incorporated by reference.

BACKGROUND

1. Technical Field

The present invention relates to a hybrid system of an engine and a motor generator, and particularly relates to a hybrid system of an engine and a motor generator capable of obtaining an optimum operation state in accordance with a driven apparatus and a driving apparatus connected with a pair of rotary shafts.

2. Related Art

A known power source for running of a vehicle is a hybrid system in which an engine and a motor generator are.

Such a hybrid system is designed to reduce the fuel consumption of the vehicle by charging a battery with electric power generated by the motor generator through regenerative power generation during deceleration of the vehicle, and using the electric power for driving during acceleration of the vehicle.

As an example of a conventional art related to such an engine-electric hybrid vehicle, Japanese Unexamined Utility Model Application Publication No. S58-9820 describes that an engine, a motor, and a transmission are coupled to one another in this order, and clutches are provided between the engine and the motor, and between the motor and the transmission.

In addition, Japanese Unexamined Patent Application Publication No. H5-305822 describes that an engine, a transmission, and a motor are coupled to one another in this order, and a one-way clutch is provided inside the transmission to allow running with the motor even when the engine is stopped.

In the conventional art described above, the hybrid system is a power unit specializing in the running of the vehicle so that the hybrid system can only have the function of performing the regenerative power generation by driving wheels via a power transmission device or by being driven from the wheels, and the use of the hybrid system for driving a plurality of driven apparatuses has not been envisioned.

On the other hand, it is desired to make the hybrid system of the engine and the motor generator adaptable to a wide variety of industrial uses without limiting its use to the vehicle, and cause the hybrid system to more efficiently drive a plurality of driven apparatuses that are conventionally driven by a general-purpose engine.

In addition, it is also desired to generate electric power with external power other than the power of the mounted engine by using such a hybrid system.

SUMMARY OF THE INVENTION

An object of the present invention is to provide the hybrid system of the engine and the motor generator capable of obtaining an optimum operation state in accordance with a driving apparatus and a driven apparatus connected with a pair of rotary shafts.

An aspect of the present invention provides a hybrid system of an engine and a motor generator, the system including: an engine provided with an output shaft of a crankshaft at one end of a crank case and a motor generator connection shaft of the crankshaft at the other end of the crank case, and adapted such that the output shaft can be connected with an external driven apparatus; a motor generator having a stator relatively fixed to the crank case and a rotor coupled with the motor generator connection shaft and rotating relative to the stator; an external apparatus connection shaft connected with the rotor, and disposed at an end of the motor generator on a side opposite to a side of the engine, and adapted so as to be connectable with the external driven apparatus or an external driving apparatus; a clutch disposed between the motor generator connection shaft of the engine and the rotor; a power storage unit to store electric power generated by the motor generator and supply the stored electric power to the motor generator; and a controller to switch between an electric power generation mode in which the motor generator is operated as a generator and a motor mode in which the motor generator is operated as a motor, and switch between engagement and disengagement of the clutch.

The controller may execute a starter operation mode in which the clutch is engaged and the motor generator is operated as the motor to start the engine.

The controller may execute an electric power generation operation mode in which the clutch is engaged and the motor generator is operated as a generator to generate electric power with an output of the engine.

The controller may execute a motor assist operation mode in which the clutch is engaged and the motor generator is operated as the motor to assist the output of the engine.

The controller may execute a motor drive operation mode in which the clutch is disengaged and the motor generator is operated as the motor to drive the driven apparatus connected with the external apparatus connection shaft only by the motor.

The controller may execute a driven electric power generation mode in which the clutch is disengaged and the motor generator is operated as the generator to generate electric power with an input from the driving apparatus connected with the external apparatus connection shaft.

The controller may execute a simultaneous assist electric power generation mode in which the clutch is engaged, a part of coils of the stator and the rotor of the motor generator are operated as the generator, and the other part of the coils of the stator and the rotor of the motor generator are operated as the motor.

BRIEF DESCRIPTION OF THE DRAWING

FIG. 1 is a schematic view illustrating the configuration of a hybrid system of an engine and a motor generator according to an implementation of the present invention.

DETAILED DESCRIPTION

Hereinbelow, a hybrid system of an engine and a motor generator according to an implementation of the present invention will be described.

FIG. 1 is a schematic view illustrating the configuration of the hybrid system of the engine and the motor generator of the implementation.

In FIG. 1, the flow of electric power is indicated by solid arrows, while the flow of a control signal is indicated by broken-line arrows.

A hybrid system 1 includes an engine 100, a motor generator 200, a battery 310, an AC-DC converter 320, an inverter 330, a clutch relay 340, and a controller 350.

The engine 100 is a general-purpose engine used for, e.g., industrial purposes, and is, e.g., a four-stroke single-cylinder OHC gasoline engine.

The engine 100 has a crank case that houses the main part of a crankshaft as an output shaft.

An output shaft 110 as one end of the crankshaft is provided so as to protrude from the end of the crank case on a side opposite to a side of the motor generator 200.

An external driven apparatus (first set apparatus) driven by the engine 100 is connected with the output shaft 110. The output shaft 110 has a shape adapted or standardized so as to be connectable with the external driven apparatus to be able to transmit an output. Examples of the external driven apparatus include industrial apparatuses, agricultural apparatuses, and construction apparatuses, and specific examples thereof include an external generator, a pump, a travel device for a vehicle, a hydraulic power unit, a compressor, a lawn mower, a high-pressure washer, a snow blower, a plate, and a concrete cutter.

The other end of the crankshaft (a motor generator connection shaft) is connected with an electromagnetic clutch 250 of the motor generator 200.

The motor generator 200 is a dynamo-electric machine that can be used as a generator that is driven from the outside to perform electric power generation and an AC motor that is supplied with electric power to generate a driving force.

The motor generator 200 includes a rotary shaft 210, a rotor 220, a first stator 230, a second stator 240, and the electromagnetic clutch 250.

The rotary shaft 210 is disposed concentrically with the crankshaft of the engine 100.

One end of the rotary shaft 210 is connected to the crankshaft via the electromagnetic clutch 250.

The other end of the rotary shaft 210 protrudes from the end of the motor generator 200 on a side opposite to a side of the engine 100, and the protruding part functions as an external apparatus connection shaft with which an external apparatus (second set apparatus) is connected. The external apparatus may be a driven apparatus or a driving apparatus. The rotary shaft 210 has a shape adapted or standardized so as to be connectable with the external apparatus to be able to transmit an input and an output. As the external apparatus, there can be used, e.g., a waterwheel, a windmill, an external engine, and an external motor.

The rotor 220 is a disk-like member that is fixed to the rotary shaft 210 and formed to protrude to the side of an outer diameter and have the shape of a flange.

The rotor 220 is formed of a ferromagnetic material, and is subjected to N-S polarization having a predetermined pattern.

The first stator 230 is disposed so as to oppose the surface of the rotor 220 on the side of the engine 100 at a predetermined interval.

The first stator 230 is configured by circumferentially arranging a plurality of coils each formed by winding a wire around a core.

The second stator 240 is disposed so as to oppose the surface of the rotor 220 on a side opposite to the side of the engine 100 at a predetermined interval.

The second stator 240 is configured by circumferentially arranging a plurality of coils each formed by winding the wire around the core.

The first stator 230 and the second stator 240 are fixed to a stator housing fixed to the crank case of the engine 100 to be thereby relatively fixed to the crank case.

The electromagnetic clutch 250 switches between the connection and disconnection of the crankshaft of the engine 100 with and from the rotary shaft 210.

The electromagnetic clutch 250 has a coil that is supplied with electric power from the clutch relay 340 to thereby generate magnetic flux, a frictional member attached to the ferromagnetic material is sucked and crimped to the coil by its electromagnetic force, and a connection state that allows power transmission is established. When the electric power supply to the coil is interrupted, the frictional member is spaced from the coil by a biasing unit such as a return spring or the like, and a disconnection state that interrupts the power transmission is established.

A battery 310 is charged (stored) with electric power generated by the motor generator 200, and supplies electric power for driving when the motor generator 200 is operated as the motor.

The battery 310 is a secondary battery such as, e.g., a lithium-ion battery or a nickel-metal hydride battery.

When the motor generator 200 is used as the generator, the AC-DC converter 320 converts AC electric power generated by the first stator 230 and the second stator 240 into DC electric power, and supplies the DC electric power to the battery 310.

When the motor generator 200 is driven as an AC motor, the inverter 330 converts direct current supplied from the battery 310 into alternating current, and supplies the alternating current to the coils of the first stator 230 and the second stator 240.

The clutch relay 340 is a relay that switches between energization (clutch engagement) and non-energization (clutch disengagement) of the electromagnetic clutch 250.

The controller 350 integrally controls the AC-DC converter 320, the inverter 330, and the clutch relay 340 to execute various operation modes described below.

Hereinbelow, the individual operation modes will be described.

<Starter Operation Mode>

The controller 350 starts the engine 100 by engaging the electromagnetic clutch 250 and operating the motor generator 200 as the motor.

The starter operation mode is started by operating an engine start operating unit (e.g., a starter button or the like), which is not shown in figures, by a user and is ended by ending the operation of the engine start operating unit after the start of the engine.

Alternatively, the starter operation mode may also be automatically ended by, e.g., detecting complete explosion (start end) of the engine 100 from the rotation speed of the crankshaft or the like.

According to the starter operation mode, more labor can be saved than in a case where the start of the engine 100 is performed by man power using a recoil starter or the like, and it is not necessary to provide a starter motor used exclusively for starting the engine so that the configuration can be simplified. In addition, noises such as sound caused by the mesh of gears and the like do not occur when the engine is started, and hence it is possible to start the engine quietly.

<Electric Power Generation Operation Mode>

The controller 350 performs electric power generation by engaging the electromagnetic clutch 250 and operating the motor generator 200 as the generator during the operation of the engine 100.

According to this mode, it is possible to use the hybrid system 1 similarly to a common engine driven motor.

At this point, the external driven apparatus connected with the output shaft 110 of the engine 100 can be driven simultaneously.

According to the electric power generation operation mode, it is possible to use the surplus output of the engine output other than the output thereof used for the electric power generation for the drive of the external driven apparatus to thereby improve convenience.

<Motor Assist Operation Mode>

The controller 350 assists the drive of the external driven apparatus using the output of the engine 100 by engaging the electromagnetic clutch 250 and operating the motor generator 200 during the operation of the engine 100.

According to the motor assist operation mode, in a case where the external driven apparatus temporarily requires a large output, it is possible to cope with the case without increasing the displacement of the engine or the like.

In addition, in a case where the required output is constant, it becomes possible to reduce the displacement and the rotation of the engine to thereby reduce fuel consumption.

<Motor Drive Operation Mode>

The controller 350 performs the drive of the external driven apparatus connected with the rotary shaft 210 only by the output of the motor generator 200 by disengaging the electromagnetic clutch 250 and operating the motor generator 200 as the motor during the stop of the engine 100.

According to the motor drive operation mode, in a case where the drive of the driven apparatus can be performed only by the output of the motor generator 200, it becomes possible to operate the driven apparatus without starting the engine 100 to thereby improve quietness or the like.

In addition, since the motor generator 200 can be switched between forward rotation and reverse rotation, for example, in a case where the reverse rotation of the motor generator is temporarily required such as, e.g., during backing up in a case where the motor generator is used as power for running of a vehicle, it is not necessary to provide a mechanism such as a gear train for the reverse rotation or the like, and hence the configuration of the system can be simplified.

Note that the above-described motor drive operation mode can be executed also during the operation of the engine 100.

In this case, the engine 100 can drive another driven apparatus independently of the motor generator 200.

<Driven Electric Power Generation Mode>

The controller 350 performs electric power generation with the power of the external driving apparatus connected with the rotary shaft 210 by disengaging the electromagnetic clutch 250 and operating the motor generator 200 as the generator during the stop of the engine 100.

As the external driving apparatus, there can be used, e.g., a waterwheel, a windmill, an external engine, or an external motor. In addition, in a case where the hybrid system 1 is mounted on a vehicle, it is also possible to perform regenerative power generation.

According to the driven electric power generation mode, it is possible to perform the electric power generation by driving the hybrid system from the outside and, at this point, it is not necessary to idle the engine, and hence electric power generation efficiency can be enhanced by reducing friction.

Note that the above-described driven electric power generation mode can be executed also during the operation of the engine 100.

In this case, the engine 100 can drive another driven apparatus independently of the motor generator 200.

<Simultaneous Assist Electric Power Generation Mode>

The controller 350 can drive the external driven apparatus by using the output of the engine 100 and the output of the motor generator 200 as the motor, and perform the electric power generation by engaging the electromagnetic clutch 250, using a part of the stator coils of the motor generator 200 as the generator, and using the other part of the stator coils of the motor generator 200 as the motor during the operation of the engine 100.

For example, the rotor 220 and the first stator 230 can be used as the generator, and the rotor 220 and the second stator 240 can be used as the motor.

According to the simultaneous assist electric power generation mode, it is possible to perform the electric power generation and motor assist simultaneously, drive the external apparatus with a large output, and use the motor generator 200 as an AC power supply.

As has been described above, according to the present implementation, by switching between the function of the motor generator 200 as the generator and the function thereof as the motor and switching between the engagement and disengagement of the electromagnetic clutch 250, it becomes possible to set the optimum operation state according to the type of the apparatus connected with the output shaft 110 of the engine 100 and the rotary shaft 210 of the motor generator 200.

In addition, by using an axial gap type motor generator as the motor generator 200, it is possible to reduce the axial dimension of the motor generator 200 to thereby reduce the entire length of the hybrid system 1, and enhance convenience in mounting the hybrid system 1 on the apparatus.

(Modification)

The present invention is not limited to the above-described implementation, and various modifications and changes can be made, which are also within the technical scope of the present invention.

The configuration of the hybrid system of the engine and the motor is not limited to the above-described implementation, and can be appropriately changed.

For example, while the secondary battery is used as the power storage unit in the implementation, other power storage units such as, e.g., a capacitor and the like may also be used instead of the secondary battery. In addition, the type of the secondary battery is not particularly limited.

Further, the external driving apparatus and the external driven apparatus are not particularly limited.

The invention claimed is:

1. A hybrid system of an engine and a motor generator, the system comprising:
    an engine provided with an output shaft of a crankshaft at one end of a crank case and a motor generator connection shaft of the crankshaft at the other end of the crank case, and adapted such that the output shaft can be connected with an external driven apparatus;
    a motor generator having a stator relatively fixed to the crank case and a rotor coupled with the motor generator connection shaft and rotating relative to the stator;
    an external apparatus connection shaft connected with the rotor, and disposed at an end of the motor generator on a side opposite to a side of the engine, and adapted so as to be connectable with the external driven apparatus or an external driving apparatus;
    a clutch disposed between the motor generator connection shaft of the engine and the rotor;
    a power storage unit to store electric power generated by the motor generator and supply the stored electric power to the motor generator; and
    a controller to switch between an electric power generation mode in which the motor generator is operated as a generator and a motor mode in which the motor generator is operated as a motor, and switch between engagement and disengagement of the clutch, wherein the controller executes a driven electric power generation mode in which the clutch is disengaged and the motor generator is operated as the generator to generate electric power with an input from the driving apparatus connected with the external apparatus connection shaft.

2. The hybrid system of an engine and a motor generator according to claim 1, wherein the controller executes a starter operation mode in which the clutch is engaged and the motor generator is operated as the motor to start the engine.

3. The hybrid system of an engine and a motor generator according to claim 1, wherein the controller executes a motor assist operation mode in which the clutch is engaged and the motor generator is operated as the motor to assist the output of the engine.

4. The hybrid system of an engine and a motor generator according to claim 1, wherein the controller executes a motor drive operation mode in which the clutch is disengaged and the motor generator is operated as the motor to drive the driven apparatus connected with the external apparatus connection shaft only by the motor.

5. The hybrid system of an engine and a motor generator according to claim 1, wherein the controller executes a simultaneous assist electric power generation mode in which the clutch is engaged, a part of coils of the stator and the rotor of the motor generator are operated as the generator, and the other part of the coils of the stator and the rotor of the motor generator are operated as the motor.

6. The hybrid system of an engine an a motor generator according to claim 1, wherein the motor generator further includes a second stator relatively fixed to the crank case and on an opposite side of the rotor as the stator.

7. The hybrid system of an engine and a motor generator according to claim 1, wherein the controller executes an electric power generation operation mode in which the clutch is engaged and the motor generator is operated as a generator to generate electric power with an output of the engine.

8. The hybrid system of an engine and a motor generator according to claim 7, wherein the driven apparatus connected with the output shaft of the crankshaft is driven in the electric power generation operation mode.

9. The hybrid system of an engine and a motor generator according to claim 1, wherein the motor generator comprises an axial gap type motor generator in which the rotor is formed into a disk-like shape, and the stator is disposed so as to axially oppose the rotor.

10. The hybrid system of an engine and a motor generator according to claim 9, wherein the controller executes a starter operation mode in which the clutch is engaged and the motor generator is operated as the motor to start the engine.

11. The hybrid system of an engine and a motor generator according to claim 9, wherein the controller executes a motor assist operation mode in which the clutch is engaged and the motor generator is operated as the motor to assist the output of the engine.

12. The hybrid system of an engine and a motor generator according to claim 9, wherein the controller executes a motor drive operation mode in which the clutch is disengaged and the motor generator is operated as the motor to drive the driven apparatus connected with the external apparatus connection shaft only by the motor.

13. The hybrid system of an engine and a motor generator according to claim 9, wherein the controller executes a simultaneous assist electric power generation mode in which the clutch is engaged, a part of coils of the stator and the rotor of the motor generator are operated as the generator, and the other part of the coils of the stator and the rotor of the motor generator are operated as the motor.

14. The hybrid system of an engine and a motor generator according to claim 9, wherein the controller executes an electric power generation operation mode in which the clutch is engaged and the motor generator is operated as a generator to generate electric power with an output of the engine.

15. The hybrid system of an engine and a motor generator according to claim 14, wherein the driven apparatus connected with the output shaft of the crankshaft is driven in the electric power generation operation mode.

\* \* \* \* \*